(12) United States Patent
Martin et al.

(10) Patent No.: US 11,718,501 B2
(45) Date of Patent: Aug. 8, 2023

(54) ELEVATOR SHEAVE WEAR DETECTION

(71) Applicant: OTIS ELEVATOR COMPANY, Farmington, CT (US)

(72) Inventors: Kyle B. Martin, Avon, CT (US); James L. Hubbard, Kensington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 559 days.

(21) Appl. No.: 16/840,632

(22) Filed: Apr. 6, 2020

(65) Prior Publication Data

US 2021/0309486 A1 Oct. 7, 2021

(51) Int. Cl.
*B66B 5/00* (2006.01)
*B66B 3/00* (2006.01)
*B66B 15/02* (2006.01)
*G01V 8/12* (2006.01)

(52) U.S. Cl.
CPC ............ *B66B 5/0025* (2013.01); *B66B 3/002* (2013.01); *B66B 5/0031* (2013.01); *B66B 15/02* (2013.01); *G01V 8/12* (2013.01)

(58) Field of Classification Search
CPC ..... B66B 5/0025; B66B 3/002; B66B 5/0031; B66B 15/02; G01V 8/12
See application file for complete search history.

(56) References Cited

U.S. PATENT DOCUMENTS

| 4,145,920 A * | 3/1979 | Yamagami ............ B66B 7/1223 187/390 |
|---|---|---|
| 7,192,185 B2 | 3/2007 | Lustenberger |
| 7,578,373 B2 | 8/2009 | Shiratsuki et al. |
| 7,637,357 B2 | 12/2009 | Nakagawa et al. |
| 7,715,026 B2 | 5/2010 | Nayebi |
| 8,297,413 B2 | 10/2012 | Kigawa et al. |
| 8,686,747 B2 | 4/2014 | Berner et al. |
| 8,813,918 B2 | 8/2014 | Kocher et al. |
| 8,863,906 B2 | 10/2014 | Mustalati et al. |
| 9,063,009 B2 | 6/2015 | Husmann et al. |
| 9,359,172 B2 * | 6/2016 | Mangini ................... B66B 7/06 |
| 9,604,821 B2 | 3/2017 | Korvenrata et al. |
| 9,676,592 B2 * | 6/2017 | Wells ...................... B66B 5/022 |
| 9,758,343 B2 | 9/2017 | Helenius |
| 9,771,244 B2 | 9/2017 | Lehtinen et al. |
| 9,856,110 B2 | 1/2018 | Putkinen |
| 9,878,878 B2 | 1/2018 | Saarelainen et al. |
| 9,932,203 B2 | 4/2018 | Robibero |

(Continued)

FOREIGN PATENT DOCUMENTS

| CA | 3092895 C * | 8/2022 | ............ B66B 15/00 |
|---|---|---|---|
| CN | 101219672 B | 9/2010 | |

(Continued)

*Primary Examiner* — Michael A Riegelman
(74) *Attorney, Agent, or Firm* — Carlson, Gaskey & Olds, P.C.

(57) ABSTRACT

An illustrative example embodiment of an elevator sheave wear monitoring device includes at least one detector situated to detect a position of elevator roping that is indicative of a condition of a sheave that the roping at least partially wraps around, the at least one detector providing an output corresponding to the detected position of the elevator roping and indicating an amount of wear of the sheave that exceeds at least one threshold.

10 Claims, 3 Drawing Sheets

(56) References Cited

U.S. PATENT DOCUMENTS

| | | | |
|---|---|---|---|
| 10,018,597 | B2 | 7/2018 | Hirokawa et al. |
| 10,088,300 | B2 | 10/2018 | Martinod Restrepo et al. |
| 10,202,258 | B2 | 2/2019 | Dold et al. |
| 10,377,605 | B2 | 8/2019 | Puranen et al. |
| 10,549,953 | B2 | 2/2020 | Palazzola et al. |
| 10,621,385 | B2 | 4/2020 | Ehmke et al. |
| 10,816,534 | B2 | 10/2020 | Werheit |
| 10,895,451 | B2 | 1/2021 | Feng et al. |
| 10,941,021 | B2 * | 3/2021 | Zhao ............... B66B 7/062 |
| 11,465,879 | B2 | 10/2022 | Kato et al. |
| 2013/0133983 | A1 * | 5/2013 | Mangini ............. B66B 5/021 |
| | | | 187/277 |
| 2016/0376125 | A1 * | 12/2016 | Wells ................ B66B 5/02 |
| | | | 187/266 |
| 2019/0202667 | A1 | 7/2019 | Zhang |
| 2020/0055696 | A1 * | 2/2020 | Hubbard ........... B66B 5/0025 |
| 2020/0055707 | A1 * | 2/2020 | Hubbard ............. B66B 15/04 |
| 2021/0024331 | A1 * | 1/2021 | Martin ................ B66B 15/02 |
| 2021/0309486 | A1 * | 10/2021 | Martin .............. B66B 5/0025 |
| 2022/0250874 | A1 | 8/2022 | Valjus et al. |
| 2022/0315385 | A1 * | 10/2022 | Martin ................ B66B 3/002 |
| 2023/0002194 | A1 | 1/2023 | Dold |

FOREIGN PATENT DOCUMENTS

| | | | | |
|---|---|---|---|---|
| CN | 103204416 | B | 6/2015 | |
| CN | 103954553 | B | 12/2015 | |
| CN | 103387171 | B | 9/2016 | |
| CN | 104228875 | B | 1/2017 | |
| CN | 104444728 | B | 2/2017 | |
| CN | 206124811 | U | 4/2017 | |
| CN | 107200042 | A | 9/2017 | |
| CN | 107673150 | A | 2/2018 | |
| CN | 108059050 | A | 5/2018 | |
| CN | 207330025 | U | 5/2018 | |
| CN | 105292181 | B | 6/2018 | |
| CN | 106395527 | B | 10/2018 | |
| CN | 106969722 | B | 5/2019 | |
| CN | 107076545 | B | 8/2019 | |
| CN | 110240038 | A | 9/2019 | |
| CN | 110255324 | A | 9/2019 | |
| CN | 110255325 | A | 9/2019 | |
| CN | 209367590 | U | 9/2019 | |
| CN | 210286364 | U | 4/2020 | |
| CN | 106927327 | B | 6/2020 | |
| CN | 108946360 | B | 6/2020 | |
| CN | 111699150 | A | 9/2020 | |
| CN | 110498315 | B | 10/2020 | |
| CN | 111847191 | A | 10/2020 | |
| CN | 109650230 | B | 12/2020 | |
| CN | 110482353 | B | 3/2021 | |
| CN | 112429614 | A | 3/2021 | |
| CN | 112693989 | A | 4/2021 | |
| CN | 108639098 | B | 5/2021 | |
| CN | 112797918 | A | 5/2021 | |
| CN | 112797919 | A | 5/2021 | |
| CN | 213141056 | U | 5/2021 | |
| CN | 111108054 | B | 6/2021 | |
| CN | 112938801 | A | 6/2021 | |
| CN | 213536927 | U | 6/2021 | |
| CN | 213778919 | U | 7/2021 | |
| CN | 113562563 | A | 10/2021 | |
| CN | 111847174 | B | 11/2021 | |
| CN | 110713093 | B | 12/2021 | |
| CN | 215666436 | U | 1/2022 | |
| CN | 112219122 | B | 4/2022 | |
| CN | 114368655 | A | 4/2022 | |
| CN | 111836772 | B | 6/2022 | |
| CN | 216889636 | U | 7/2022 | |
| CN | 113321102 | B | 8/2022 | |
| CN | 112960521 | B | 9/2022 | |
| CN | 115321294 | A | 11/2022 | |
| CN | 208088463 | U | 12/2022 | |
| EP | 1489034 | B1 | 10/2009 | |
| EP | 1642858 | B1 | 11/2011 | |
| EP | 2336072 | B1 | 2/2013 | |
| EP | 2497741 | B1 | 4/2014 | |
| EP | 2020394 | B1 | 12/2017 | |
| EP | 3275732 | B1 | 11/2018 | |
| EP | 3642146 | B1 | 4/2021 | |
| EP | 3892578 | A1 * | 10/2021 | ............ B66B 3/002 |
| JP | 2012056698 | A * | 3/2012 | |
| WO | WO-2012162853 | A1 * | 12/2012 | ........... B66B 5/0025 |
| WO | WO-2019230154 | A1 * | 12/2019 | |

* cited by examiner

ELEVATOR SHEAVE WEAR DETECTION

BACKGROUND

Elevator systems are useful for carrying passengers and items between different levels of a building. Many elevator systems are traction-based and include roping that suspends the elevator car and a counterweight. A machine causes movement of a traction sheave that, in turn, causes movement of the roping for moving the elevator car as desired. The roping typically follows a path that includes several sheaves.

Elevator sheaves include a surface that engages the roping and, therefore, is subject to wear over time. Various approaches have been used in the industry to address such wear. For example, plastic sheave liners have been used to establish a desired level of traction. Plastic sheave liners tend to introduce less wear on the elevator roping. Replacing plastic sheave liners is more economical than replacing or reconditioning an entire sheave.

Regardless of the type of sheave or liner, excessive wear should be avoided to prevent damage to the sheave. If a sheave or liner wears too much, the sheave may need to be repaired or discarded, which introduces additional cost and requires taking the elevator out of service while the situation is rectified. The industry standard technique for determining an amount of wear requires a mechanic to observe and measure the condition of the sheave. That approach is time consuming and can only reasonably be done infrequently.

SUMMARY

An illustrative example embodiment of an elevator sheave wear monitoring device includes at least one detector situated to detect a position of elevator roping that is indicative of a condition of a sheave that the roping at least partially wraps around, the at least one detector providing an output corresponding to the detected position of the elevator roping and indicating an amount of wear of the sheave that exceeds at least one threshold.

An example embodiment having at least one feature of the device of the previous paragraph includes a processor configured to determine when the detected position of the elevator roping indicated by the at least one detector indicates an amount of wear of the sheave that exceeds at least one threshold and provide an indication that the amount of wear exceeds the at least one threshold.

In an example embodiment having at least one feature of the device of any of the previous paragraphs, the processor is configured to determine an amount of time that the detected position of the elevator roping indicates the amount of wear of the sheave that exceeds the threshold and provide the indication only if the determined amount of time exceeds a predetermined minimum.

In an example embodiment having at least one feature of the device of any of the previous paragraphs, the at least one threshold comprises a first threshold and a second threshold; and the at least one detector is configured to determine whether the detected position of the elevator roping indicated by the at least one detector indicates an amount of wear of the sheave exceeds the first threshold, determine whether the detected position of the elevator roping indicated by the at least one detector indicates an amount of wear of the sheave that exceeds the second threshold, and provide the indication by providing a first indication when the amount of wear exceeds the first threshold but not the second threshold and providing a second indication when the amount of wear exceeds the second threshold.

In an example embodiment having at least one feature of the device of any of the previous paragraphs, the second indication corresponds to a request or a command to shut down an associated elevator system.

In an example embodiment having at least one feature of the device of any of the previous paragraphs, the at least one detector is situated to detect the position of the elevator roping near a location where contact between the elevator roping and the sheave begins or ends.

In an example embodiment having at least one feature of the device of any of the previous paragraphs, the at least one detector is situated to detect the position of the elevator roping relative to a center of the sheave.

In an example embodiment having at least one feature of the device of any of the previous paragraphs, the at least one detector comprises an optical sensor.

In an example embodiment having at least one feature of the device of any of the previous paragraphs, the at least one detector comprises a proximity sensor.

In an example embodiment having at least one feature of the device of any of the previous paragraphs, the at least one detector comprises a contact sensor.

An illustrative example embodiment of a method of monitoring elevator sheave wear includes detecting a position of elevator roping that is indicative of a condition of a sheave that the roping at least partially wraps around; determining when the detected position of the elevator roping indicates an amount of wear of the sheave that exceeds at least one threshold; and providing an indication that the amount of wear exceeds the at least one threshold.

An example embodiment having at least one feature of the method of the previous paragraph includes determining an amount of time that the detected position of the elevator roping indicates the amount of wear of the sheave that exceeds the threshold and providing the indication only if the determined amount of time exceeds a predetermined minimum.

In an example embodiment having at least one feature of the method of any of the previous paragraphs, the at least one threshold comprises a first threshold and a second threshold and the method includes determining whether the detected position of the elevator roping indicated by the at least one detector indicates an amount of wear of the sheave exceeds the first threshold and determining whether the detected position of the elevator roping indicated by the at least one detector indicates an amount of wear of the sheave that exceeds the second threshold. Providing the indication comprises providing a first indication when the amount of wear exceeds the first threshold but not the second threshold and providing a second indication when the amount of wear exceeds the second threshold.

In an example embodiment having at least one feature of the method of any of the previous paragraphs, the second indication corresponds to a request or a command to shut down an associated elevator system.

In an example embodiment having at least one feature of the method of any of the previous paragraphs, the detecting is performed by at least one detector situated to detect the position of the elevator roping at a location where contact between the elevator roping and the sheave begins or ends.

In an example embodiment having at least one feature of the method of any of the previous paragraphs, the at least one detector is situated to detect the position of the elevator roping relative to a center of the sheave.

The various features and advantages of at least one disclosed example embodiment will become apparent to those skilled in the art from the following detailed description. The drawings that accompany the detailed description can be briefly described as follows.

DETAILED DESCRIPTION

Figure 1:
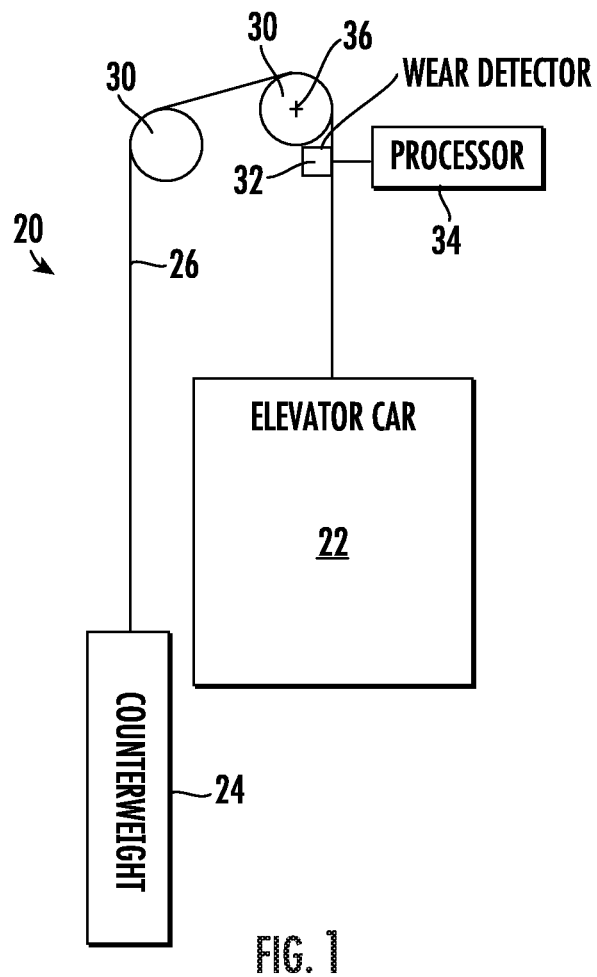
FIG. 1 schematically illustrates selected portions of an elevator system.

FIG. 1 schematically illustrates selected portions of an elevator system 20. An elevator car 22 is coupled to a counterweight 24 by roping 26. Although not shown in detail in FIG. 1, the roping 26 includes a plurality of tension members, such as round steel ropes or flat belts. The roping 26 follows a path defined, at least in part, by sheaves 30. At least one of the sheaves 30 is a traction sheave associated with a machine (not illustrated) that selectively causes movement of the roping 26 to control the movement and position of the elevator car 22 for providing elevator service to passengers.

At least one wear detector 32 is situated near one of the sheaves 30, which is the traction sheave in this example. The wear detector 32 detects a position of the roping 26 that is indicative of an amount of wear on the sheave 30 surface that engages the roping 26 as the roping 26 at least partially wraps around the sheave 30. The detector in this example is situated to detect a position of the roping 26 near a location where contact between the sheave 30 and the roping 26 begins or ends, depending on the direction the roping 26 is moving as the elevator car 22 moves. In the illustrated example, the wear detector 32 is situated to detect the position of the roping 26 along a line that corresponds to a tangent to the location of initial or final contact between the roping 26 and the sheave 30. In the illustrated embodiment, the wear detector 32 detects a position of the roping 26 relative to a center 36 of the sheave, which is an axis of rotation of the sheave 30.

In the illustrated example embodiment, a processor 34, which comprises a computing device and memory, receives indications from the wear detector 32 regarding the position of the roping 26. The processor 34 is configured to determine when the detected location of the roping 26 corresponds to an amount of wear on the sheave 30 that satisfies at least one criterion. The processor 34 is configured to provide an indication when the detected roping position indicates an amount of wear that exceeds a threshold. The indication may be useful as a notification that the sheave 30 or its liner needs attention because of the amount of wear. One feature of the illustrated arrangement is that the processor may be programmed or configured to perform more detailed analysis or to provide more detailed outputs than just an indication of the sheave needing maintenance or a need to shut down the elevator system.

Other embodiments do not include a separate processor. In some such embodiments, a passive switch is activated based on the wear detector 32 detecting a wear condition of the sheave that requires attention. The passive switch may activate an indicator that the sheave requires attention in the near future or it may cause a shut-down of the elevator system if the amount of detected wear is significant enough to warrant shut-down. In other embodiments, the wear detector is configured to provide an output that corresponds to or indicates the detected wear condition of the sheave.

Figure 2:
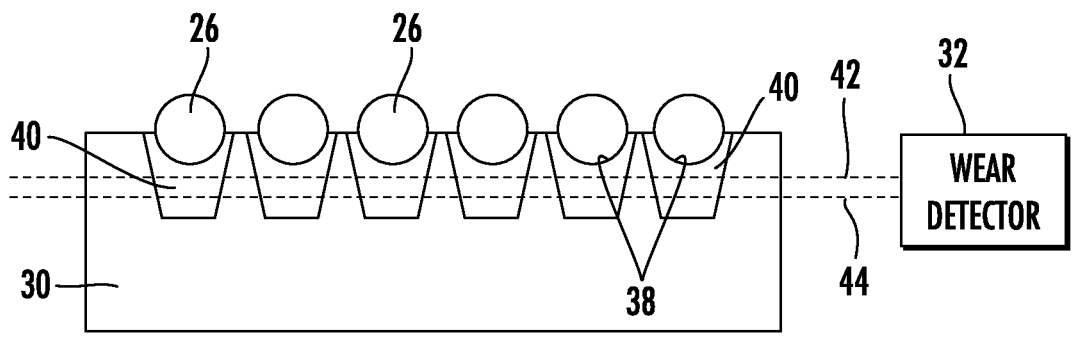
FIG. 2 schematically illustrates a portion of an example elevator sheave and thresholds corresponding to different amounts of wear.

FIG. 2 illustrates a portion of the sheave 30 and shows how each of the ropes is received in a groove 38 in a sheave liner 40. A thickness of the liners 40 or the radius of the sheave 30 dictates the position of the roping in the illustration. Over time the sheave liners 40 will wear and the roping 26 will be situated closer to the center of the sheave 30 (e.g., lower according to the drawing). The wear detector 32 in this example is configured to detect when the roping position corresponds to different amounts of wear. A first threshold 42 corresponds to a first amount of wear and a second threshold 44 corresponds to a second, greater amount of wear. The wear detector 32 in this embodiment detects the position of the roping 26 and provides an output to the processor 34 that indicates whether the roping 26 is in a position corresponding to the first threshold 42 or the second threshold 44.

Figure 3:
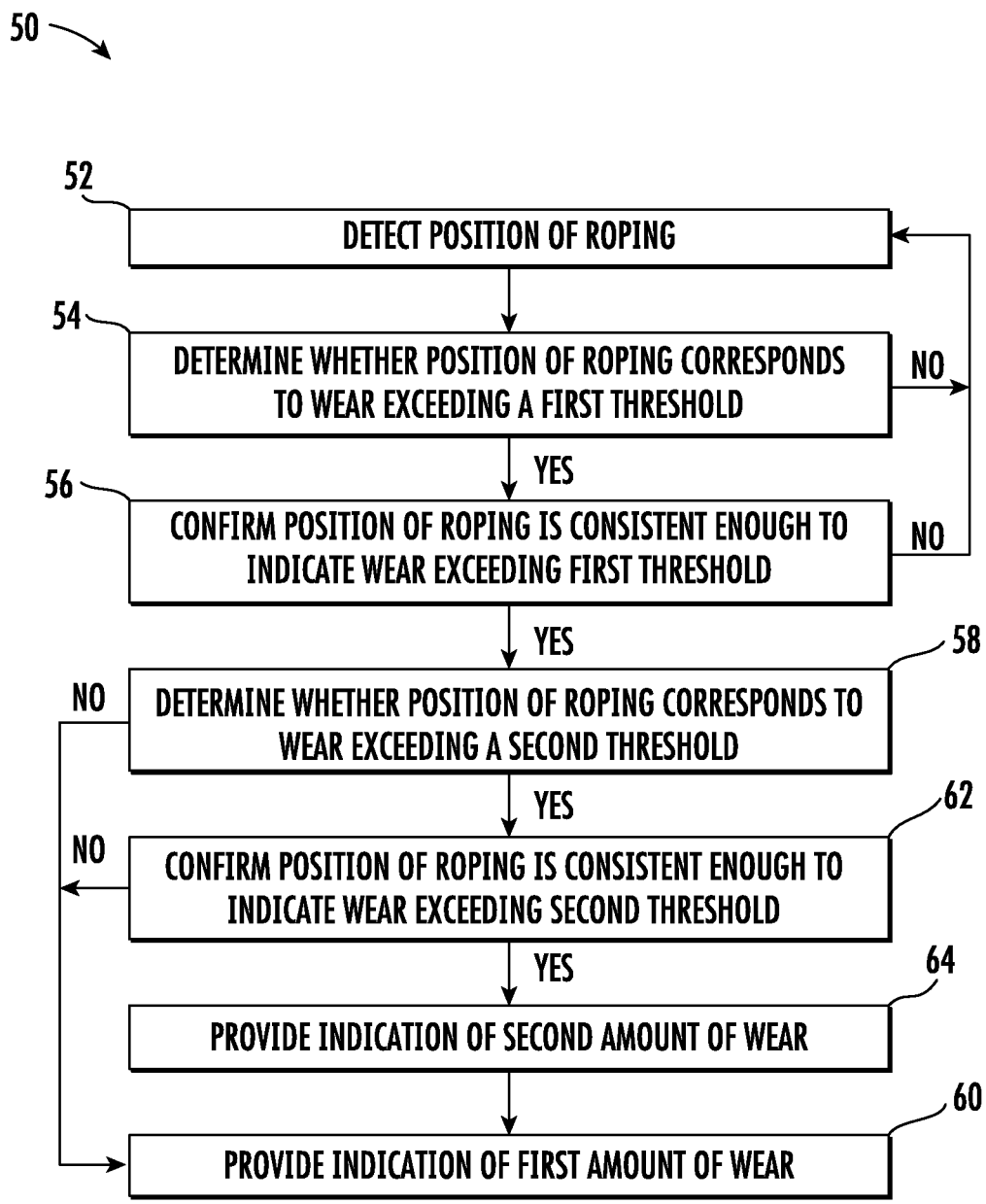
FIG. 3 is a flow chart diagram summarizing and example method of monitoring elevator sheave wear.

FIG. 3 includes a flow chart diagram 50 that summarizes a method of monitoring wear on the sheave 30. At 52, the wear detector 32 detects the position of the roping 26. In embodiments that include the processor 34, the wear detector 32 provides a corresponding indication to the processor 34. At 54, a determination is made whether the detected position of the roping 26 corresponds to wear on the sheave 30 (or the liners 40) exceeds the first threshold 42. This may be accomplished by the wear detector 32 or the processor 34, depending on the particular embodiment. If the roping position does not correspond to wear sufficient to meet or exceed the first threshold 42, then the process continues at 52. The wear detector 32 may continuously provide an output of the detected roping position or periodically detect the position and provide a corresponding output.

If the roping position corresponds to wear exceeding the first threshold 42, a determination is made at 56 whether that position of the roping has been consistent enough to indicate wear exceeding the first threshold. This determination is a way of filtering out any movement of the roping, such as vibration, that may falsely indicate sheave wear. Such movement of the roping will not be continuous or consistent over time and the illustrated method includes the determination at 56 to verify when a detected roping position is based on the wear condition of the sheave 30 rather than some other condition in the elevator system 20.

Situating the wear detector 32 to detect the roping position as close as possible to the place where contact between the sheave 30 and the roping 26 begins or ends tends to minimize false positive detections that may be caused by rope or belt movement that is due to roping sway or vibration.

The determination at 56 is made by the processor 34 in some embodiments. In others, the wear detector 32 has a time delay function or feature that will delay an output from the wear detector 32 until a sufficient time has passed that the roping remains in a location corresponding to sheave wear.

For example, when a detected roping position corresponds to sheave wear that exceeds the first threshold 42 for only a few seconds or the signal from the wear detector 32 is not constant, the decision at 56 is negative and the process returns to detecting the roping position at 52.

If the detected roping position consistently corresponds to sheave wear exceeding the first threshold within predetermined parameters, then whether the detected roping position corresponds to sheave wear exceeding the second threshold 44 is determined at 58. If the second threshold is not exceeded, then the wear detector 32 or the processor 34 provides a first indication at 60. The first indication provides information regarding the condition of the sheave such as an amount of wear that requires attention or scheduling a liner replacement in the near future.

When the position of the roping 26 corresponds to wear exceeding the second threshold 44, a determination is made whether that roping position has been consistent enough to indicate actual wear at 62. Again, there may be temporary conditions in the elevator system 20 that tend to cause movement of the roping, such as vibration or sway, that may result in the roping 26 temporarily moving into a position that could be incorrectly interpreted as resulting from sheave wear. The determination at 62 filters out such temporary roping positions to eliminate false positive determinations of wear exceeding the second threshold 44.

When the roping position corresponds to wear exceeding the second threshold 44, the method includes providing a second indication at 64. In some embodiments, the second indication at 64 corresponds to a request for sheave maintenance or liner repair as soon as possible. In some embodiments, the second indication may be or request a command to shut down the elevator system until the sheave 30 is inspected and serviced.

In some embodiments, the wear detector 32 will include more than one detector with each of them associated with a particular wear threshold. Other embodiments include a wear detector that is configured to provide an indication of the location over a sufficient distance or number of locations in a manner that indicates whether the amount of wear has reached more than one threshold.

Figure 4:
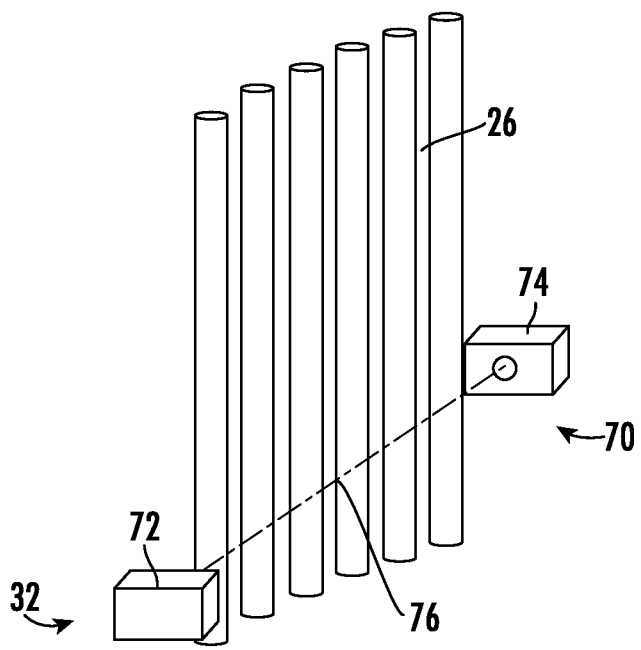
FIG. 4 schematically illustrates an example embodiment of a wear detector including a light-based sensor configuration.

Some embodiments include an optical sensor that detects the position of the roping 26. For example, FIG. 4 schematically shows an optical sensor 70. In one embodiment, the optical sensor includes a laser diode 72 and a receiver or deflector 74 situated so that the roping 26 interrupts the light beam 76 of the laser diode 72 when the sheave wear reaches a selected threshold. In some embodiments, multiple light beams are used with each beam aligned with a respective threshold.

Another example type of optical sensor 70 includes a camera that provides image information regarding the position of the roping 26 and, therefore, the wear condition of the sheave 30. For example, the camera would be situated in place of the laser diode 72 and the receiver or deflector 74 would be replaced with a reference image or background that would be interrupted or otherwise appear different in an image from the camera when the roping 26 position changes because of sheave wear.

Figure 5:
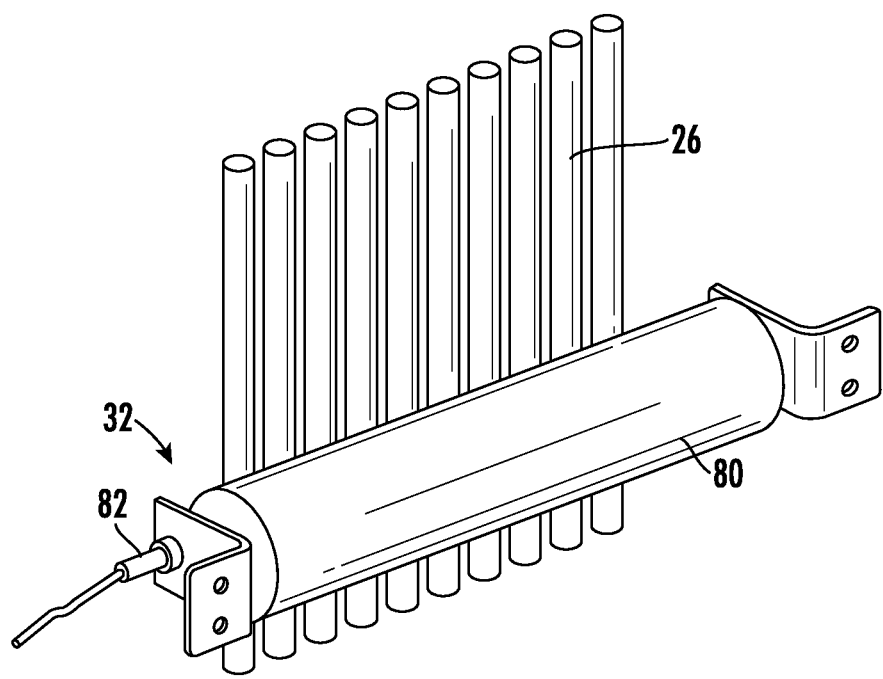
FIG. 5 schematically illustrates an example embodiment of a wear detector including a contact-based sensor configuration.

Other embodiments of the wear detector 32 include at least one proximity sensor or at least one contact sensor. The embodiment shown in FIG. 5 includes at least one roller 80 situated to be contacted by the roping 26. A sensor 82 provides an output when the roller 80 rotates as a result of contact with the roping 26 during elevator car movement. The roller 80 is supported by brackets 84 in a position where the roping 26 will normally not contact the roller 80 until the sheave or its liner has worn an amount corresponding to a selected threshold. In some such embodiments, the output of the sensor 82 indicates wear depending on an amount of time that the roller 80 has been rotating with longer times indicating increasing wear.

Those skilled in the art who have the benefit of this description will realize what sensor type and arrangement will best meet their particular needs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator sheave wear monitoring device, comprising
at least one detector situated to detect a position of elevator roping that is indicative of a condition of a sheave that the roping at least partially wraps around, the at least one detector providing an output corresponding to the detected position of the elevator roping and indicating an amount of wear of the sheave that exceeds at least one threshold; and
a processor configured to
determine an amount of time that the detected position of the elevator roping consistently indicates the amount of wear of the sheave that exceeds the threshold, and
delay an output from the wear monitoring device indicating that the amount of wear exceeds the at least one threshold until the determined amount of time exceeds a predetermined minimum.

2. The device of claim 1, wherein
the at least one threshold comprises a first threshold and a second threshold, and
the at least one detector is configured to
determine whether the detected position of the elevator roping indicated by the at least one detector indicates an amount of wear of the sheave exceeds the first threshold;
determine whether the detected position of the elevator roping indicated by the at least one detector indicates an amount of wear of the sheave that exceeds the second threshold; and
provide the indication by
providing a first indication when the amount of wear exceeds the first threshold but not the second threshold, and
providing a second indication when the amount of wear exceeds the second threshold.

3. The device of claim 2, wherein the second indication corresponds to a request or a command to shut down an associated elevator system.

4. The device of claim 1, wherein the at least one detector is situated to detect the position of the elevator roping at a location corresponding to where contact between the elevator roping and the sheave begins or ends.

5. The device of claim 4, wherein the at least one detector is situated to detect the position of the elevator roping relative to a center of the sheave.

6. The device of claim 1, wherein the at least one detector comprises an optical sensor.

7. The device of claim 1, wherein the at least one detector comprises a proximity sensor.

8. The device of claim 1, wherein the at least one detector comprises a contact sensor.

9. An elevator sheave wear monitoring device, comprising at least one detector situated to detect a position of elevator roping that is indicative of a condition of a sheave that the roping at least partially wraps around, the at least one detector providing an output corresponding to the detected position of the elevator roping and indicating an amount of wear of the sheave that exceeds at least one threshold, wherein the at least one threshold comprises a first threshold and a second threshold, and the at least one detector is configured to determine whether the detected position of the elevator roping indicated by the at least one detector indicates an amount of wear of the sheave exceeds the first threshold;

determine whether the detected position of the elevator roping indicated by the at least one detector indicates an amount of wear of the sheave that exceeds the second threshold; and provide the indication by providing a first indication when the amount of wear exceeds the first threshold but not the second threshold, and providing a second indication when the amount of wear exceeds the second threshold.

10. The device of claim 9, wherein the second indication corresponds to a request or a command to shut down an associated elevator system.

\* \* \* \* \*